United States Patent
Miskovic

(10) Patent No.: US 12,022,032 B1
(45) Date of Patent: Jun. 25, 2024

(54) SERVER GENERATED TIMING OF LOCATION UPDATES FOR CALL ROUTING DECISIONS

(71) Applicant: 8x8, Inc., Campbell, CA (US)

(72) Inventor: Slobodan Miskovic, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 388 days.

(21) Appl. No.: 17/464,281

(22) Filed: Sep. 1, 2021

Related U.S. Application Data

(63) Continuation of application No. 16/738,469, filed on Jan. 9, 2020, now Pat. No. 11,122,166, which is a continuation of application No. 15/146,559, filed on May 4, 2016, now Pat. No. 10,542,150.

(51) Int. Cl.
| | |
|---|---|
| *H04L 41/0813* | (2022.01) |
| *H04L 67/1008* | (2022.01) |
| *H04L 67/52* | (2022.01) |
| *H04M 7/00* | (2006.01) |
| *H04W 4/02* | (2018.01) |

(52) U.S. Cl.
CPC ........ *H04M 7/006* (2013.01); *H04L 41/0813* (2013.01); *H04L 67/1008* (2013.01); *H04L 67/52* (2022.05); *H04W 4/02* (2013.01)

(58) Field of Classification Search
CPC ..... H04M 7/006; H04W 4/02; H04L 41/0813; H04L 67/1008; H04L 67/52
See application file for complete search history.

(56) References Cited

U.S. PATENT DOCUMENTS

| | | | |
|---|---|---|---|
| 7,218,722 B1 * | 5/2007 | Turner | H04M 7/006 709/204 |
| 8,531,995 B2 * | 9/2013 | Khan | H04L 12/66 370/328 |
| 8,554,168 B1 * | 10/2013 | Bonner | H04W 4/90 455/457 |
| 8,661,121 B1 * | 2/2014 | Mendis | H04W 4/02 709/224 |
| 10,326,888 B1 * | 6/2019 | Miskovic | H04M 7/1285 |
| 10,530,934 B1 * | 1/2020 | Miskovic | H04L 45/302 |
| 10,542,150 B1 * | 1/2020 | Miskovic | H04L 67/1008 |
| 11,032,428 B1 * | 6/2021 | Miskovic | H04M 7/128 |
| 11,076,051 B1 * | 7/2021 | Miskovic | H04L 65/1063 |
| 11,122,166 B1 * | 9/2021 | Miskovic | H04L 65/1069 |
| 11,553,091 B1 * | 1/2023 | Miskovic | H04L 65/80 |
| 2006/0109838 A1 * | 5/2006 | Smith | H04L 65/103 370/352 |

(Continued)

*Primary Examiner* — Benjamin H Elliott, IV
(74) *Attorney, Agent, or Firm* — Crawford Maunu PLLC

(57) ABSTRACT

A data-communications (e.g. VoIP-type) server is configured to provide data-communications services such as VoIP services to a plurality of endpoint devices. The server receives, from applications running on the endpoint devices, location updates identifying geographic locations of the endpoint devices. The server may modify a location database to include entries specifying the geographic locations of the endpoint devices. Data/telephone calls are routed based upon the entries specifying geographic locations of the plurality of endpoint devices. Based upon input parameters, a set of periodic update timings are generated and sent to the endpoint devices.

19 Claims, 6 Drawing Sheets

(56) References Cited

U.S. PATENT DOCUMENTS

| | | | |
|---|---|---|---|
| 2006/0146784 A1* | 7/2006 | Karpov | H04L 45/3065 370/352 |
| 2006/0165015 A1* | 7/2006 | Melick | H04W 8/26 370/254 |
| 2007/0253413 A1* | 11/2007 | Citron | H04W 4/02 370/389 |
| 2010/0002850 A1* | 1/2010 | Jaiswal | H04M 3/4938 379/88.04 |
| 2010/0165072 A1* | 7/2010 | Oike | H04L 12/1822 348/14.09 |
| 2010/0220852 A1* | 9/2010 | Willman | H04Q 3/66 379/265.11 |
| 2011/0149950 A1* | 6/2011 | Petit-Huguenin | H04M 7/0084 370/352 |
| 2011/0158233 A1* | 6/2011 | Namgung | H04N 21/23 709/227 |
| 2012/0047266 A1* | 2/2012 | Minert | H04M 11/06 709/226 |
| 2012/0163184 A1* | 6/2012 | Choi | H04L 65/1016 370/252 |
| 2012/0317207 A1* | 12/2012 | Eydelman | H04L 61/4511 709/206 |
| 2014/0226537 A1* | 8/2014 | Kashimba | H04L 65/4038 370/261 |
| 2014/0280898 A1* | 9/2014 | Voit | H04L 43/028 709/224 |
| 2015/0131648 A1* | 5/2015 | Shuman | H04L 65/1073 370/352 |
| 2015/0181548 A1* | 6/2015 | Varoglu | H04W 4/33 455/456.2 |
| 2015/0201086 A1* | 7/2015 | Abi | H04M 1/2535 370/352 |
| 2016/0028881 A1* | 1/2016 | Assem | H04L 47/196 370/252 |
| 2016/0105801 A1* | 4/2016 | Wittenberg | H04W 4/029 455/411 |
| 2016/0216125 A1* | 7/2016 | Ahn | G08G 1/096811 |
| 2017/0245196 A1* | 8/2017 | Yeager | H04M 15/8044 |

\* cited by examiner

SERVER GENERATED TIMING OF LOCATION UPDATES FOR CALL ROUTING DECISIONS

OVERVIEW

Use of data communications, including voice conveyed over the Internet Protocol (VoIP) has allowed individuals to make telephone calls using broadband Internet connections in place of traditional telephone lines. A Web or Internet-communicative endpoint device can use a broadband Internet connection to connect to a data-communications server (e.g., VoIP-type data-communications server that provides VoIP-type data-communications services) that is managed by a VoIP service provider. The server can handle call routing and provide other VoIP services for the VoIP endpoint device. The use of such data technology can allow for a great deal of flexibility in the geographic location (geolocation) at which an individual places and receives telephone calls, while using the same endpoint device and phone number. The geolocation of an endpoint device can affect how the server handles calls to and from the endpoint device. Geolocation is a difficult problem to implement in practice. The Internet Protocol (IP) addresses can dynamically change and there is no single authoritative source of geolocation data for tracking all of these changes.

SUMMARY

Various example embodiments are directed to issues such as those addressed above and/or others which may become apparent from the following disclosure. Certain embodiments of the present disclosure are directed toward apparatuses (including systems and their devices) and methods for use with a Voice over Internet Protocol (VoIP) server that is configured to provide VoIP services to a plurality of VoIP-capable endpoint devices.

According to certain specific embodiments, method is provided for use with a Voice over Internet Protocol (VoIP) server that is configured to provide VoIP services to a plurality of VoIP-capable endpoint devices. The method includes: receiving, at the VoIP server and from applications running on the plurality of VoIP-capable endpoint devices, location updates identifying geographic locations of the plurality of VoIP-capable endpoint devices; modifying, in response to a mismatch between the compared geographic locations, a location database to include entries specifying the geographic locations of the plurality of VoIP-capable endpoint devices; routing the telephone calls based upon the entries specifying geographic locations of the plurality of VoIP-capable endpoint devices; generating, based upon input parameters, a set of periodic update timings specifying rates for the plurality of VoIP-capable endpoint devices to provide the geolocation information; and sending the periodic update timings to the plurality of VoIP-capable endpoint devices.

Certain embodiments of the present disclosure are directed toward a system that includes a Voice over Internet Protocol (VoIP) server that includes one or more computer processor circuits and memory circuits that are configured to provide VoIP services to a plurality of VoIP-capable endpoint devices by: receiving, at the VoIP server and from applications running on the plurality of VoIP-capable endpoint devices, location updates identifying geographic locations of the plurality of VoIP-capable endpoint devices; modifying, in response to a mismatch between the compared geographic locations, a location database to include entries specifying the geographic locations of the plurality of VoIP-capable endpoint devices; routing the telephone calls based upon the entries specifying geographic locations of the plurality of VoIP-capable endpoint devices; generating, based upon input parameters, a set of periodic update timings specifying rates for the plurality of VoIP-capable endpoint devices to provide the geolocation information; and sending the periodic update timings to the plurality of VoIP-capable endpoint devices.

The above discussion/summary is not intended to describe each embodiment or every implementation of the present disclosure. The figures and detailed description that follow also exemplify various embodiments.

BRIEF DESCRIPTION OF THE FIGURES

The disclosure may be more completely understood in consideration of the following detailed description of various embodiments of the disclosure, in connection with the accompanying drawings in which.

Figure 1:
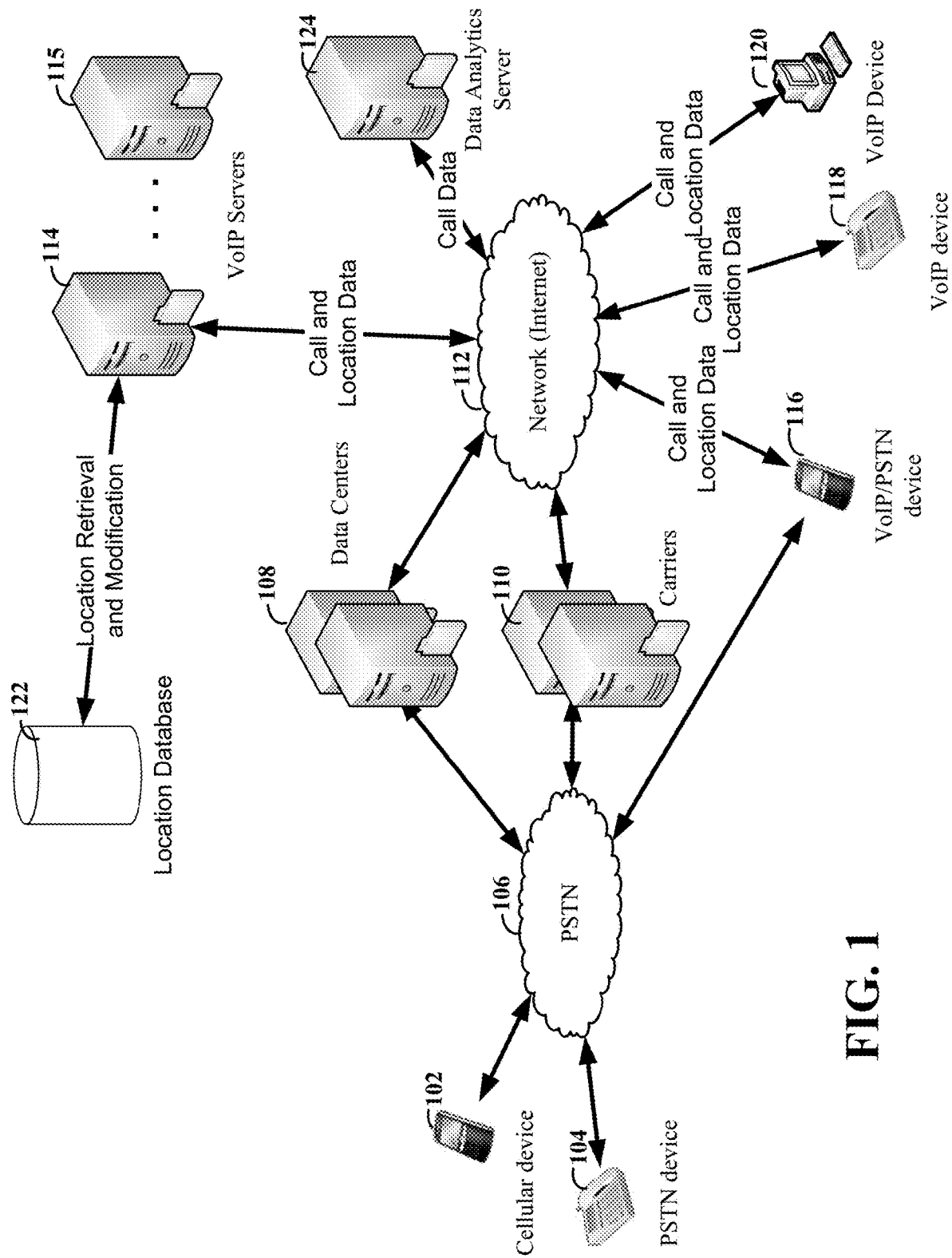
FIG. 1 depicts a system diagram for using geolocation information provided from endpoint devices, consistent with specific embodiments of the present disclosure.

While various embodiments are amenable to various modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DETAILED DESCRIPTION

Aspects of the present disclosure are believed to be applicable to a variety of different types of apparatuses, systems and methods relating to selection of telephone carriers based upon geolocation information. Various embodiments of the present disclosure are directed towards location updates for use with a Voice over Internet Protocol (VoIP) server that is configured to provide VoIP services to a plurality of VoIP-capable endpoint devices (sometimes referred to simply as an "endpoint" or a "VoIP endpoint").

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination.

While the present disclosure is not necessarily limited to such embodiments, certain embodiments are disclosed and/or illustrated in connection with the VoIP server being configured to communicate with an application running on a particular VoIP-capable endpoint device, where the application provides geolocation information that identifies a geographic location of the particular endpoint device. In certain embodiments, the VoIP server also relies on the IP address used by the particular endpoint device to obtain secondary geolocation information specifying another geographic location. This additional geolocation information can be obtained from IP registration data, IP geolocation services, or other sources that correlate an IP address with a geolocation.

According to various embodiments discussed herein, the geographic location indicated by the IP address is sometimes inconsistent with the actual geographic location of the endpoint device (as indicated by the secondary geolocation information). The VoIP server can be configured to compare the two geographic locations to detect a mismatch. In response to a mismatch between the compared geographic locations, a location database can be modified accordingly. For instance, the location database can include an entry for each endpoint device. The entries can specify a current IP address, a user identifier/telephone number, and a geographic location. The modification can include storing data in the database to effect a modification of the entry. The modified entry updates the location for the particular endpoint device to indicate the location provided by the application running on the particular VoIP-capable endpoint device, whereas before the modification of the entry might have specified a geographic location associated with the IP address, or some other geographic location.

According to certain embodiments, the VoIP server receives one or more outgoing calls from the particular endpoint device. The VoIP server can access the location database to retrieve the entry that specifies that the particular endpoint device is located at the geographic location provided by the application running on the endpoint device. Using this geographic location information, the VoIP server can select a telephone carrier to use for routing the outgoing call. Various embodiments allow for the VoIP server to use the geolocation information select components other than a telephone carrier, such as a media server. As discussed herein, a media server is a server that is deployed in voice networks and provides media related functions, such as media manipulation (e.g., applying codecs), recording functions, playing of tones or announcements, or media relay (proxy) functions.

Turning now to the figures, FIG. 1 depicts a system diagram for using geolocation information provided from endpoint devices, consistent with embodiments of the present disclosure. In connection with these specifically-illustrated examples, VoIP endpoint devices 116, 118, and 120 are configured to place and receive VoIP telephone calls between other VoIP endpoint devices, and also between non-VoIP endpoint devices 102 and 104. The depicted examples of non-VoIP endpoints devices include plain old telephone service (POTS) telephones 104, and cellular-capable devices 102 (e.g., smart phones). The various endpoint devices include circuitry that is specially configured to provide calling functions that include interfacing with the appropriate circuitry of the call service provider used by the corresponding endpoint device. In many contexts a VoIP-endpoint device is a VoIP-capable telephone commonly referred to as IP phones. The VoIP-endpoint devices can include, but are not limited to, desktop computers, mobile (smart) phones, laptop computers, and tablets. When each of the endpoint devices originates or receives a call in a telephone network, each can be characterized or referred to as an addressable call endpoint or a dial peer. The call routing and other services for these VoIP telephone calls can be provided by one or more VoIP servers 114, 115. A particular example of a VoIP server uses session initiation protocol (SIP) to handle various call functions (e.g., call setup and tear down); however, the various embodiments discussed herein are not necessarily limited thereto.

Consistent with the above and in other embodiments disclosed herein, the VoIP servers 114, 115 can be configured to establish a leg of the call from the VoIP endpoint devices (or dial peers) to another VoIP endpoint device or to a gateway. In certain embodiments, the VoIP provider that operates the VoIP servers 114, 115 can use telephone carriers 108,110 to establish additional legs. For example, when the one of the dial peers is not part of the VoIP provider's network, the VoIP servers 114, 115 can be configured to use telephone carriers 110 and data centers 108. Accordingly, one element of call routing can include the selection of telephone carriers or media servers 108, 110 to complete the corresponding leg of the call. For ease of discussion, various embodiments are discussed in connection with one of either telephone carriers or data centers that include media servers. The corresponding embodiments are not necessarily limited thereto.

The telephone carriers can complete the call leg by establishing audio connections over the public-switched telephone network (PSTN) 106, the Internet 112, or both the PSTN 106 and Internet 112. Various aspects of the present disclosure recognize that selection of a telephone carrier can result in significant differences in the costs and quality for a particular telephone call. For example, this is a likely situation when dealing with global/international calls. In such situations, the VoIP provider may have the option of using a telephone carrier based out of the United Kingdom (UK) or a global/international carrier that handles calls from any country. The UK-based carrier may be preferred over another carrier when the VoIP endpoint device is located within the UK, while the international carriers may be preferred when the VoIP endpoint device is located in other countries.

According to various embodiments of the present disclosure, the VoIP servers 114, 115 uses a location database 122 to determine the geographic location for a VoIP endpoint device. The geographic location is then used to select the appropriate telephone carrier. Consistent with various embodiments, the geographic location can be provided from a number of different potential sources. A first potential source is the global/external IP address used by the VoIP endpoint device. The registration for the IP addresses are controlled by the Internet Assigned Numbers Authority (IANA), and includes several regional registries. An individual with an assigned IP address can link an IP address to a network adapter and can also register one or more domain names for the IP address. The registration can include geolocation information for the entity assigned to the IP address and generally for the location of the network adapter. Domain name system (DNS) servers can propagate the domain name throughout the DNS.

Embodiments of the present disclosure are directed toward the recognition that a registered location for an IP address is not always accurate for a VoIP endpoint device using that IP address. For example, a VoIP endpoint device can be part of a local network that accesses the Internet using an external IP address. The DNS for the external IP address can be hosted by a remote service, which can be located in a completely different geographic location relative to the VoIP endpoint device. Accordingly, the VoIP endpoint devices 116, 118, and 120 can be configured to run a software application that ascertains the geographic location of the endpoint device and communicates this information to the VoIP servers 114, 115. For example, the software application could access Global Positioning System (GPS) data from a GPS module of the VoIP endpoint device to obtain the geolocation information. The reported geolocation information can then be used as a second potential source and be provided to the VoIP servers 114, 115 and compared to the geolocation information for the IP address, as stored in the location database 122.

In certain embodiments, the software application can be configured to only provide geolocation information when it detects a location change from the previously reported geolocation information. The software application can store the previously reported geolocation information and periodically compare against a newly-determined GPS location, for instance. In some embodiments, the software application can be configured with one or more trigger events that correspond to when a location change justifies reporting of the change. For example, a radius of a certain number of miles could be used. In some instances, the radius can be relative to the previously reported geolocation information. For instance, the trigger could be set so that the software application provides a location update anytime the endpoint device has moved a mile from the last reported geolocation. A radius might also be relative to location of a data center (and corresponding media servers) to which the endpoint device is assigned. In this instance, the software application could be provided with the geolocation of the current data center and provide software updates if the endpoint device moves outside of a certain distance. This can be particularly useful for selection of a data center that has less latency and jitter. The reduced latency and jitter is often correlated with less hops in a connection path between the data center and the endpoint device, and the number of hops is generally consistent with the physical distance.

While the term radius is used in various examples, more complex shapes could also be implemented. For example, the software application could be provided with a data center map that defines geographic regions for each data center. The software application could be configured with a trigger event that corresponds to the endpoint device moving into a new region that is associated with a different data center.

In some instances, the software application could be programmed with knowledge of different regions associated with different telephone carrier preferences. The trigger event can correspond to situations where the geographic location indicates that the VoIP endpoint device has moved to a new region. A trigger event might also correspond to the expiration of a time period relative to a prior geographic update by the endpoint device. For example, the trigger event might be such that the endpoint device provides a geographic location every four hours. In certain embodiments, the time period can be set differently for different geographic locations. For instance, if end-point location registration is currently linked to a data center that covers all of Europe and a user is in central Europe, an update might only be set for every eight hours (e.g., because it is unlikely that a user will physically leave Europe in less than that time period). The limits on when geolocation information is reported can be particularly useful for improving scalability of the system, e.g., by reducing data communications and associated computer processing time resulting from the received geolocation information and the updating of the location database 122.

In particular implementations, the trigger events that are based upon geographic regions or radii from a static point can be configured with a hysteresis that helps to avoid a flood of updates from an endpoint device where a trigger event is generated many times in a short period of time. This might occur if an endpoint device is near a boundary for a trigger event and the software application that ascertains the geographic location detects movement of small distances that traverse the boundary. The source of the detected movement could be actual movement of the endpoint device or small variations in accuracy of the location by the location module (e.g., GPS). The hysteresis could take several different forms, alone or in combination. For example, two different trigger event locations (corresponding to a change between data centers) can be used and distinguished depending upon which direction the endpoint is moving. In other words, the effective coverage maps for two different data centers could overlap, and an endpoint device in the overlap will remain linked to the prior data center. Thus, two endpoint devices in the same location within the overlapping area could be linked to different data centers depending on which data center the endpoint was linked with prior to entering the overlapping area. Another type of hysteresis is time based. For example, the software application could be configured with a delay that prevents a location update from being provided, or processed, within a certain amount of time after a recent update was provided.

Certain embodiments are directed toward the use of geolocation information, received from one VoIP endpoint device, in carrier selection decisions for other VoIP endpoint devices. For instance, two VoIP endpoint devices might share the same external IP address when they are part of the same local area network (LAN). The VoIP server might obtain GPS-based geolocation information from an application running on one of the VoIP endpoint devices, while a second of the VoIP endpoint devices might not have GPS capabilities. If the GPS location information matches the geolocation information for the external IP address, this might indicate that other devices using the IP address are likely to be located at the same geographic location. The VoIP server can therefore use the same geographic location information for each of the VoIP endpoint devices using the common external IP address. If the GPS-based geolocation information does not match the geolocation information from the external IP address, this could indicate that the external IP address is inaccurate, or that devices using the external IP address are not co-located with the network adapter linked to the external IP address. In either case, the VoIP server could mark the geographic location for the VoIP endpoint device without GPS capabilities as unreliable and select an appropriate carrier (e.g., selecting a default global carrier instead of a specific local carrier).

In some instances and consistent with specific embodiments, the VoIP server receives GPS-based geolocation information from multiple VoIP endpoint devices that have GPS capabilities. The VoIP server analyzes the information and categorize the VoIP devices using the external IP address accordingly. For example, if the geolocation information provided by the VoIP endpoint devices indicate they are each co-located, the VoIP server can modify the location database to link the VoIP endpoint devices to the common location. Moreover, if other VoIP endpoint devices use the external IP address, but do not have GPS capabilities, the VoIP server can use the common location for these other VoIP endpoint devices. In another example, if the VoIP endpoint devices indicate they are not co-located, the VoIP server can modify the location database to indicate that devices using the external IP address are geographically distributed. If other VoIP endpoint devices use the external IP address, but do not have GPS capabilities, the VoIP server can indicate that the geographic location linked to the external IP address may be unreliable and select an appropriate carrier for VoIP endpoint devices that have not provided secondary geolocation information.

While GPS is discussed in connection with a number of different embodiments, endpoint devices can also determine their location using other solutions. For example, an endpoint device could derive location information from manual input from a user, cellular triangulation, Wi-Fi router data, or other sources.

According to certain embodiments of the present disclosure, the VoIP server is configured to geographic location information to make routing decisions for both inbound and outbound calls. For instance, a media server can be selected for both inbound and outbound calls. This can include the selection of a data center that is close to the geographic location of the corresponding VoIP endpoint device. The data center can be, for example, part of a cloud-based solution where the hardware providing the cloud services is located in a number of different data centers with different physical locations. Consistent with embodiments, the cloud services can include SIP servers, media servers, and servers providing other services to both VoIP endpoint devices and the users of the VoIP endpoint devices.

According to various embodiments, one or more data analytics servers 124 can monitor and analyze call data relating to the VoIP servers and VoIP endpoint devices. For example, the data analytics server 124 can be designed to track call statistics about a variety of different call-related parameters, such as call duration, call date, call time of day, called parties, endpoint devices, selected data centers, selected carriers, dropped calls, transferred calls, voicemail access, conferencing features, and others. A VoIP server can then subscribe to particular call summary metrics and the data analytics server 124 can provide data corresponding to the subscription. For example, the VoIP server could subscribe to call length summaries for all calls made to endpoints that are registered with the VoIP server. This information can then be used by the VoIP server to control how data center and carriers are selected as well as to configure the trigger events for various endpoint devices.

In some instances, the various servers, including both the VoIP Servers and data analytic servers discussed herein can have their functions spread across different physical and logical components. For instance, a cloud based solution can implement virtual servers that can share common hardware and can be migrated between different underlying hardware. Moreover, separate servers or modules can be configured to work together so that they collectively function as a single unified server.

Figure 2:
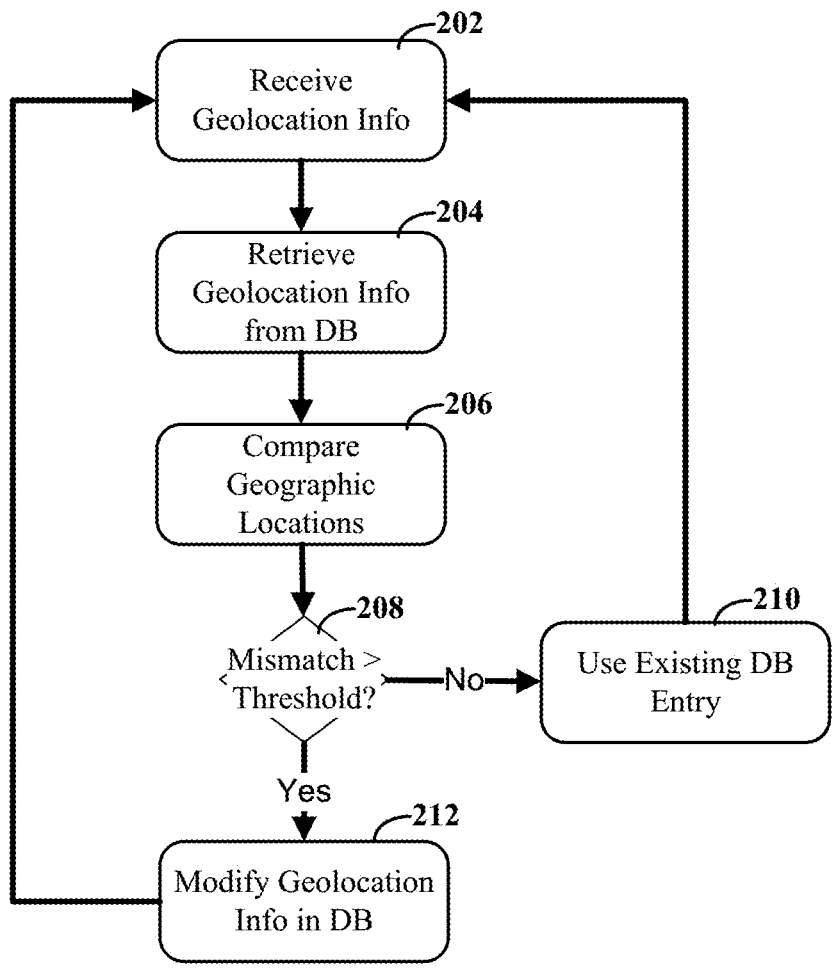
FIG. 2 depicts a flow diagram for selecting VoIP call components based upon geolocation data, consistent with specific embodiments of the present disclosure.

FIG. 2 depicts a flow diagram for selecting VoIP call components based upon geolocation data, consistent with embodiments of the present disclosure. According to certain embodiments, a VoIP server receives secondary geolocation information from a VoIP endpoint device, per block 202. This information can be provided using a network connection (e.g., through the Internet) by a software application that is running on the VoIP endpoint device. In certain embodiments, the software application is configured to provide geolocation information at set intervals. Certain embodiments of the present disclosure also allow for the software application to provide geolocation information in response to a trigger event, such as the geographic location for the VoIP endpoint device materially changing (e.g., moving to a different country or a certain distance). It is also possible that combinations of trigger events and set intervals, as well as variations upon these concepts, can be used to determine when the geolocation is provided by the VoIP endpoint devices.

As shown in the figure, the VoIP server then retrieves a geolocation entry from a location database, per block 204. The geolocation entry can be linked to the VoIP endpoint device, a user profile, an external IP address, or combinations thereof. In particular embodiments, the VoIP server can retrieve geolocation information that is linked to the external IP address. In some embodiments, this information is first obtained from a remote service that provides registration information, including geographic location data, for IP addresses and corresponding DNS assignments. In some embodiments, the initial retrieval of the registration information occurs offline. For example, when a VoIP endpoint device registers with the SIP server, the SIP server can obtain the registration information and store it in the location database for future retrieval and use.

As shown at block 206, the VoIP server compares the geographic locations for the retrieved geolocation entry from the location database to the geolocation information provided by the software application. The VoIP server can then determine whether or not any mismatch between the compared geographic locations exceeds a threshold amount, per block 208. In some instances, the threshold amount is determined upon the algorithm that is used by the VoIP server to select different routing options. For instance, if the algorithm is configured to select telephone carriers based upon country of origin, the threshold can be based upon country borders. If the VoIP server uses an algorithm that selects a media server, or data center housing one or more media server, based upon geographic distances from the server/data center, the threshold can be set to a certain mile radius relative to the currently-selected server.

As the number of endpoint devices that are each providing location updates increases, the processing time of the various steps can become increasingly important. Accordingly, the comparison of block 206 can be kept to single distance (radius) comparison to keep the processing time low. It is noted, however, that an ideal mapping between geographic locations and data centers can follow non-uniform (non-circular) dimensions. Thus, a simple distance or radius comparison will be insufficient to perfectly model such mappings. According to certain embodiments of the present disclosure, the particular radius threshold can be set based upon the likelihood that the mismatch would result in the selection of a new data center. The probability can be determined for each distance by drawing a corresponding circuit and determining the percentage of the corresponding circle's circumference that falls within a mapping region of a new data center. In certain embodiments, the probability determination can be further refined by weighting certain geographic areas differently depending upon the likelihood that a hypothetical endpoint device would be located within the corresponding areas. For example, geographic regions that are sparsely populated or that are not accessible by conventional transportation (e.g., a wilderness area) could be weighted lower than a densely populated area (e.g., the downtown of a major city). Other considerations can also be taken into account in the probability determination.

As shown at block 210, if the mismatch does not exceed the threshold, then the location database remains unchanged and the existing database entry is used for future decisions. If the mismatch does exceed the threshold, then the corresponding entry in the location database can be modified to include the secondary geolocation information, per block 212. The process can be repeated as new geolocation information is received. Although not expressly depicted, various embodiments are directed towards a VoIP server that can also be configured to update entries in the location database manually or in response to other inputs. For instance, an administrator might become aware of a problem through a customer complaint of a report from the VoIP system, such as are report showing the use of the wrong carrier for a particular endpoint device. The VoIP server can be configured to provide an interface (e.g., graphical user interface, a remote desktop connection, or a website accessible interface) that allows the administrator to select the entry for the particular endpoint device and to provide a different location that overrides geolocation information provided by the endpoint device or other source. This can be particularly useful for situations where the location of the endpoint device is being spoofed to make the endpoint device look like it is in a different location.

In certain embodiments of the present disclosure, the VoIP server can be configured to use call quality data when making routing decisions. The call quality data can include information such as latency, packet loss, jitter, user feedback, and other quality indicators. The call quality data can be obtained for each end-point device by performing a connection test or by measuring call quality metrics during live VoIP calls. The call quality data can also be collected from other end point devices and stored in one or more databases. This data can be used to determine an expected call quality for a particular end point device. For example, an endpoint device might provide GPS information indicating that it is located at particular location (e.g., a particular city). The VoIP server can make routing decisions based upon historical call quality data from other endpoint devices that were also determined to be at the particular location.

According to particular embodiments, a call data center selection that is based upon location information can be changed or refined based upon call quality data. For example, if the call quality data may be compared against one or more threshold levels to determine whether or not the routing should be modified. For instance, the VoIP server can be configured to first select default data centers for endpoint devices based their geographic locations. The VoIP server can then collect call quality data through a test procedure, through actual VoIP calls, or combinations thereof. If the call quality data is below an acceptable threshold level (e.g., the latency is above a set number of milliseconds), the VoIP server can select a different data center for the endpoint device to use.

In some embodiments, different threshold levels can be set for different call quality parameters, such as having a first threshold for latency, a second threshold for jitter, and a third threshold for packet loss. If any of the thresholds are exceeded, then the VoIP server can attempt to find a better route for the corresponding endpoint device. The VoIP server can also use a threshold that relies upon a combination of multiple call quality parameters. For example, the Mean Opinion Score (MOS), Perceptual Speech Quality Measure (PSQM), Perceptual Evaluation of Speech Quality (PESQ), and Perceptual Analysis/Measurement System (PAMS) call quality measurement methods are examples of algorithms for producing a quality metric. Corresponding thresholds can be set based upon one or more of such quality metrics.

According to certain embodiments, the VoIP server can be configured to select another route by carrying out a call quality test between the endpoint device and one or more alternative data centers. The VoIP server can then select a data center that has better call quality test results.

The use of additional call quality data can be particularly useful for situations where the geographic location is not representative of the data center that has the shortest logical data path to the endpoint device. For example, an end point device could be physically located on the West Coast of the United States (e.g. Los Angeles). Using only GPS location the VoIP server may decide to routing traffic to data center located on the West Coast. The end point device, however, might be using a virtual private network (VPN) and/or a Multiprotocol Label Switching (MPLS) network that connects to the Internet using a node located on the East Coast. Thus, the endpoint device is likely to have better call quality when communicating with a data center located on the East Coast. Accordingly, the VoIP server can take into account more than just geographic location (e.g., as might be indicated by GPS and IP address data).

Figure 3:
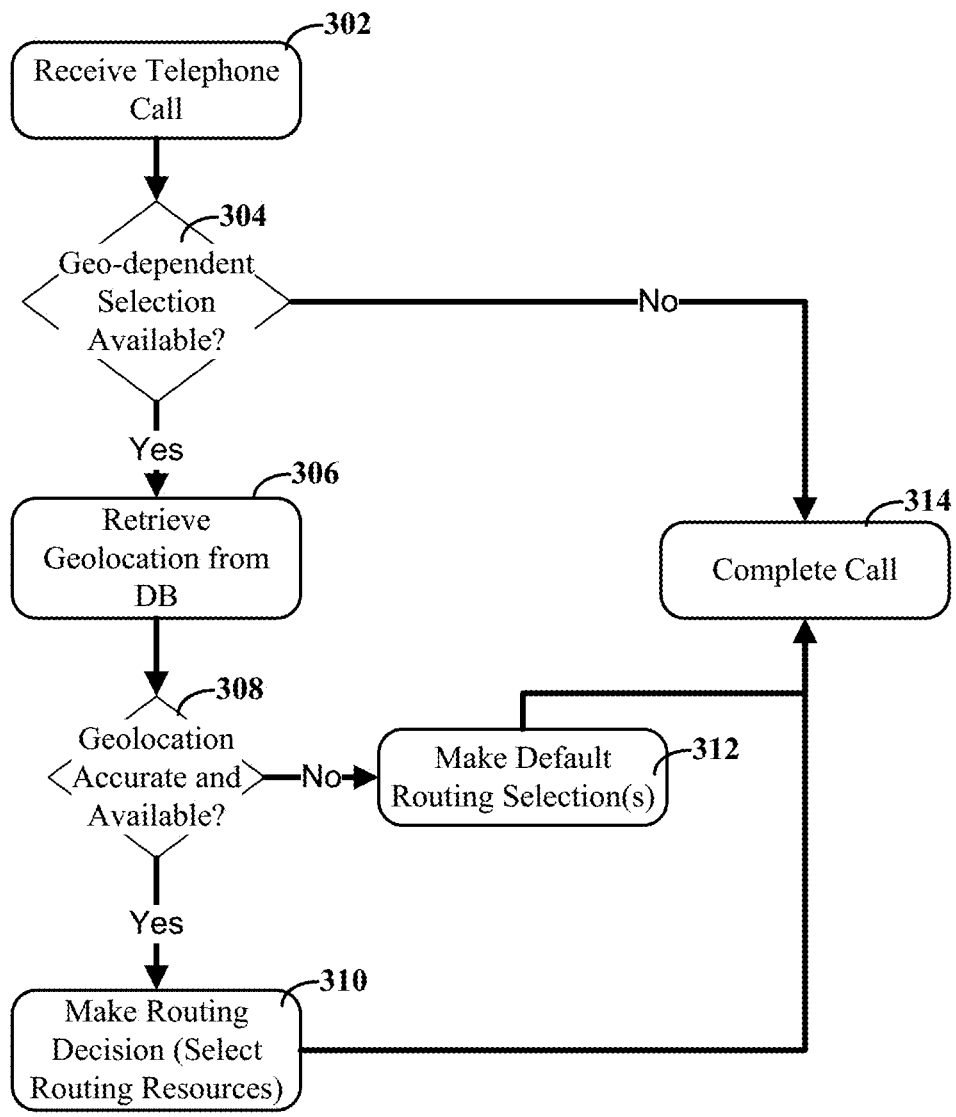
FIG. 3 depicts a flow diagram for establishing a call using geolocation information, consistent with specific embodiments of the present disclosure.

FIG. 3 depicts a flow diagram showing an example manner in which a call is established using geolocation information, consistent with various embodiments of the present disclosure. The flow diagram beings with the VoIP server receiving a call involving at least one VoIP endpoint device as a call peer, per block 302. The call can be an inbound call from a remote endpoint device (VoIP, cellular, POTs or otherwise), or an outbound call from one of the VoIP endpoint devices. In particular embodiments, the VoIP server can be configured to use SIP and the inbound or outbound calls can be initiated using an SIP invite command.

The VoIP server can then determine whether there are any selectable routing options that would be based upon geographic location of a call peer that is also a VoIP endpoint device, per block 304. If not, then the VoIP server can complete the call, per block 314. This might occur, for example, if the call is between two VoIP devices that each use the VoIP network that is serviced by the VoIP server. In such an instance, a remote telephone carrier selection might not be necessary because the call can be completed entirely over the Internet. If there are potential decisions to be made based upon geographic location of a VoIP endpoint device, then the VoIP server is configured to attempt to retrieve geolocation information from a location database (DB), per block 306.

In certain embodiments of the present disclosure, the VoIP server is configured to determine whether or not the geolocation information is both accurate (above a threshold confidence level) and available, per block 308. The VoIP server can be configured to compare the determined probability to a threshold value to make the decision that corresponds to block 308. If not, then the VoIP server makes a default selection, per block 312. For instance, the default selection could be the selection of an international carrier that offers satisfactory service across the world. If the VoIP server determines that the geolocation information is both accurate and available, the retrieved geolocation information can be used to make a proper routing decision for the call.

In particular, the routing decision can include selecting one or more routing resources (e.g., a telephone carrier, media server, or both), per block 310. The call can then be completed using the selection(s), as shown at block 314.

According to embodiments, the accuracy determination of block 308 is based upon a probabilistic determination as to the likelihood that the geolocation information is correct, also referred to as a confidence level for the accuracy of the information. The geolocation information retrieved from the database can include an indication of source for the geolocation information. The VoIP server can use this indication to determine whether the source was a DNS record, reported directly by an endpoint device (e.g., using GPS), or both. The VoIP server can then apply a different analysis depending upon the source of the indicated location. In other case, the probabilistic determination can be based upon historic data for other endpoint devices, IP external addresses, and their corresponding characteristics.

Consistent with certain embodiments of the present disclosure, blocks of IP addresses can be assigned to the same entity and therefore exhibit similar accuracy issues. For example, the entity might provide Internet access to users located in many different geographic locations, but the DNS entries for the block of IP addresses may specify the same geolocation. The VoIP server can correlate the endpoint devices having the same, or related, IP addresses. This correlation can be based upon information in the DNS entries (e.g., IP addresses owned by the same entity), subscription information for subscribers of a VoIP service, or other sources.

In a situation where the indicated location is based upon a DNS record, the VoIP server can compare the geolocation information provided by endpoint devices using the IP addresses with the DNS location to determine the number of known mismatches in the corresponding locations. This information can be used for determining the probability that the DNS-based location for a particular endpoint device is correct. Another example characteristic that can be used is how recently an IP address (DNS) registration entry was updated or how recently an IP address registration entry was changed to a new owner.

The relevance of the secondary (e.g., GPS) geolocation information can also be given a probability rating. One characteristic that can be used to determine the probability rating is the age of the information, with older information being presumptively less accurate. As discussed above, multiple endpoint devices can share the same external (WAN) IP address. Consistent with this discussion, known location information for the multiple endpoint devices that use the same, or can be compared to determine the accuracy of any particular endpoint device, even in the presence of separate GPS-type geolocation information. In the case that there are mismatches in known locations for endpoint devices having the same, or related, IP addresses, the accuracy of the location information may be called into question. As a non-limiting example, a WAN IP address (or group of correlated IP addresses) could be used by one-hundred different endpoint devices. In an extreme situation, ninety-nine of the endpoint devices may have the same, or similar, reported geolocation, while the only remaining endpoint device has a significantly different reported (GPS) geolocation. The presence of a single outlier suggests all devices may be located at the same location and that reported location for the outlier endpoint device may be incorrect. The VoIP server can therefore assign a relatively low accuracy to the geolocation for the endpoint device having the different reported geolocation.

According to certain embodiments, the probabilistic determination can include fitting a model to the historic data for endpoint devices and then determining the probability based upon the model. For instance, a model can be created using least-squares fitting or maximum likelihood estimation. Machine learning algorithms could be applied to identify relevant parameters for the probabilistic determination by classifying the data, e.g., using support vector machines or other classification algorithms. Once a model has been generated, data associated with a provided geolocation information and a corresponding IP address can be entered into the model to determine the confidence level for the accuracy of the information.

Figure 4:
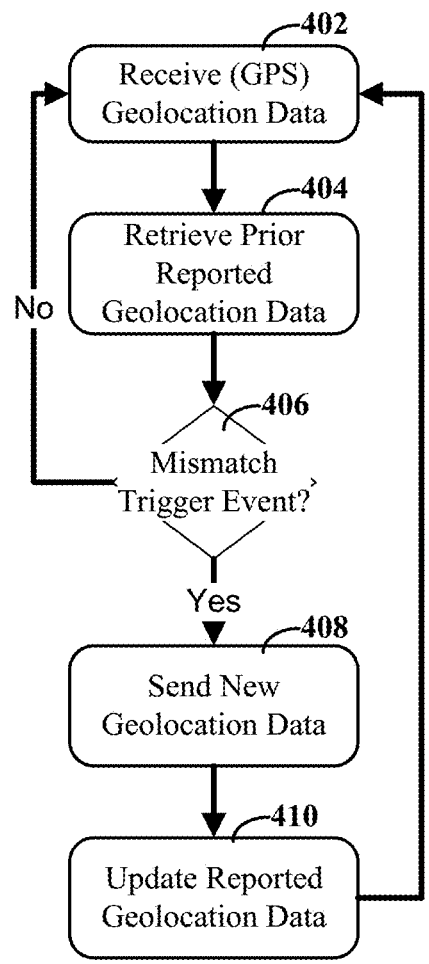
FIG. 4 depicts a flow diagram for a VoIP endpoint device application that provides geolocation updates, consistent with specific embodiments of the present disclosure.

FIG. 4 depicts a flow diagram showing an example of how a VoIP endpoint device application is able to provide geolocation updates, consistent with embodiments of the present disclosure. In this example, block 402 shows the software application being configured to interface with one or more geolocation modules of the VoIP endpoint device in order to receive geolocation information or data. For example, in such embodiments, the VoIP endpoint device can have a GPS module that provides GPS-generated coordinates. The software application might also be configured to use a location service, such as Google Location Services, which can use a combination of different inputs to derive a geographic location. This data can then be provided to a VoIP server over a network, such as the Internet.

According to certain embodiments, the software application is configured to reduce the amount of update transmissions that are made to the VoIP server. When considering scalability of the geolocation features, a reduction in communications across all VoIP endpoint devices can provide significant benefits as the number of VoIP endpoint devices increases. Accordingly, the software application can be configured to store and retrieve geolocation data that was previously provided to the VoIP server in a memory circuit of the endpoint device, per block 404.

The retrieved data can then be compared to the current geolocation information to determine whether the VoIP endpoint device has moved since previous geolocation was reported. In certain embodiments, the decision on whether or not to report new geolocation data can be made based upon whether or not a mismatch trigger event has occurred, per block 406. Mismatch trigger events can be based upon different criteria, such as the new location being outside a certain radius that is centered on the prior geographic location, the new location being in a new municipality or country, the endpoint device being registered to a different VoIP server relative to the last reporting, or other considerations. Various particular examples are discussed in more detail herein including various mismatch thresholds discussed in connection with FIG. 2.

If no trigger event is satisfied, in this example the software application is configured so that an update is not provided to the VoIP server, and the process then repeats. If a trigger event is satisfied, in this example the software application is configured to send the new geolocation data to a VoIP server, per block 408. The software application can also update the stored version of the last reported geolocation data to account for the new geolocation data that was sent to the VoIP server, per block 410. The process can then be repeated.

Figure 5:
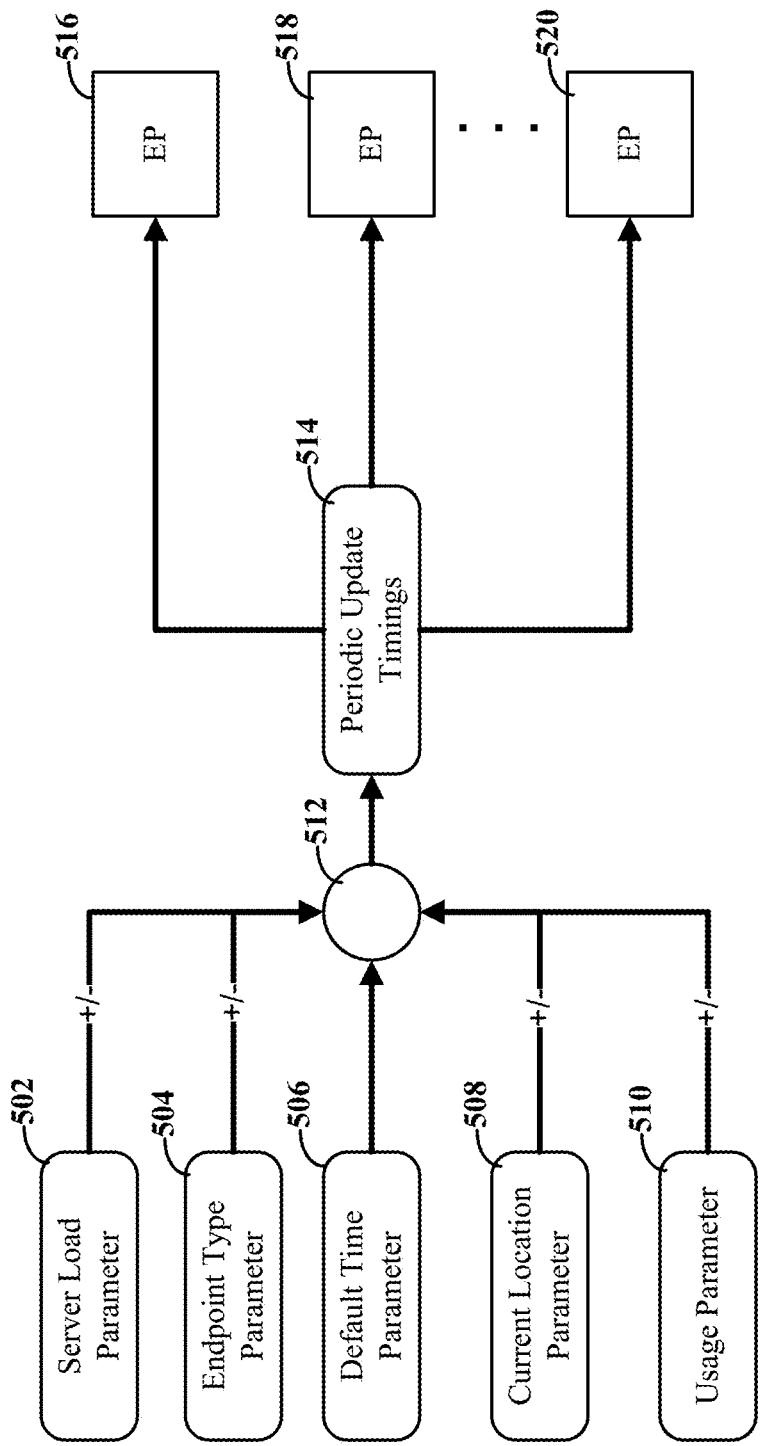
FIG. 5 depicts a flow diagram for generating periodic updating timings for different endpoints, consistent with one or more embodiments of the present disclosure.

FIG. 5 depicts a flow diagram for generating periodic updating timings for different endpoint devices, consistent with one or more embodiments of the present disclosure. According to various embodiments, the endpoint devices can be configured to provide updates in response to trigger events. One type of trigger event that can be implemented is a time-based (e.g., periodic), trigger event. For example, an endpoint device can be configured to provide an update every 24 hours. The endpoint device can track the time since the last location update was provided and provide a new update upon reaching the time specified by the trigger event (in this example 24 hours).

According to various embodiments of the present disclosure, a number of different algorithms with different input parameters can be used to determine the particular values for time-based trigger events of different endpoint devices. For example, the algorithm can be designed to calculate a deviation from a default time 506 using inputs from different data sources. One such data source can provide information regarding a load on a VoIP server, which can then be used to generate a server load parameter 502 that is used in the algorithm 512 to generate periodic update timings 514. These periodic update timings 514 can then be provided to the endpoint devices 516, 518, and 520. The server load parameter 502 can represent the amount of server resources that are used and available including, but not limited to, data bandwidth, memory space, and server processing time. The amount of available resources can be inferred from data such as the number of endpoint devices assigned to the VoIP server and from call summary metrics and analytics, as might be provided by a data analytics server, such as the data analytics server 124 from FIG. 1. In some embodiments, the available resources, such as available data bandwidth, can be directly measured using monitoring software and equipment. Combinations of inferential determinations and direct measurements can also be used.

As the server load increases, the VoIP server can adjust the server load parameter 502 to increase the timing between updates for all endpoint devices, as indicated in the periodic update timings 514. For example, the server load parameter could be expressed as a percentage or fraction. The percentage is used by the algorithm 512 to scale the periodic timings 514 for all of the endpoint devices. Thus, each endpoint device can have a separate periodic update timing value that has been scaled up or down by a percentage that corresponds to the current server load. In certain embodiments, the endpoint devices can be grouped based upon their similarities (e.g., all tablets located in a similar geographic location can be in the same group) and a single periodic update timing value can be generated for each group of endpoint devices. Other variations of how the server load parameter 502 is generated and used are also possible, such as the use of an offset value (e.g., a set amount of minutes to add or subtract from the default time). An offset value can be used in place of a percentage value or in conjunction with a percentage value.

Another possible parameter can be the endpoint device type parameter 504. For instance, the VoIP server could be configured to request more frequent updates relative to whether the endpoint device is designed for mobility. The type of endpoint device could therefore be defined relative to the expected mobility, such as having different types corresponding to smart phones, tablets, laptops, dedicated IP-phones and desktop computers. This might result in more frequent updates being provided by a smart phone than by a desktop computer, with all other considerations being equal.

Another potential parameter is the current location parameter 508. For example, an endpoint device that is very near a relevant boundary can be configured to provide more frequent updates. This might happen when an endpoint device is near country borders that define which local carrier to use, or when the endpoint device is located close to a boundary defining which data center, and corresponding media server, the endpoint device would connect with. In some instances, the updates could be (at least temporarily) increased if the endpoint device is located near a major transportation hub (e.g., an airport). Accordingly, the current location can be expressed as a parameter that takes into consideration a likelihood that the location of the endpoint device will have a material change in location for a given time period.

A further example of a parameter is a usage parameter 510. The usage parameter can be derived from call summary data that is collected from the endpoint devices. In a simplistic implementation, the usage parameter 510 could be an average number of calls per a given time period. The endpoints usage parameter 510 could be adjusted for endpoint devices that are heavily used so that they provide more frequent updates. This can be particularly useful for providing more accurate location-based updates for heavily-used endpoint devices that are more likely to be involved in one or more calls after the location has changed, but before a location update has been provided. In more particular embodiments, usage parameter 510 can be derived from other VoIP call characteristics. For example, the ratio of incoming to outgoing calls might be a relevant consideration. For outgoing calls, the VoIP server can select both which carrier is used and which media server is used. Incoming calls, however, already have a carrier selected by the caller. Thus, the number outgoing calls might carry more weight than the number of incoming calls when determining the usage parameter 510.

Some VoIP endpoint devices might be seldom, if ever, used, while others might be used many times a day. As a particular example, a VoIP provided might allow individuals to download a software application to their mobile device (e.g., smart phone). This might result in many individuals downloading the application even if they use it infrequently, if at all, and each of these downloaded applications being a potential source for update information. The relative harm in caused by inaccurate location information would be expected to be lower for the infrequently used endpoint devices, because fewer calls would be expected from such devices. Conversely, a VoIP endpoint device that is used very frequently has a greater chance that calls will occur before the location information is updated, leading to more calls being handled with inaccurate location information.

Consistent with certain embodiments, the algorithm 512 can be designed to incorporate several different parameters to generate the periodic update timings. For example, the algorithm can allow each parameter to specify a percentage ($A_0$, $B_0$, $C_0$) and an offset ($A_1$, $B_1$, $C_1$). The default value D (representing the periodic update time) can be adjusted according to a formula: $D_{Adjusted\ Time} = (D*A_0*B_0*C_0) + A_1 + B_1 + C_1$. According to particular implementations, additional scaling factors are used to meet target outcomes. For example, a target outcome might be used to limit the amount of updates at each server to a desired rate for that server (e.g., a certain number of updates per minute). The $D_{Adjusted\ Time}$ could be scaled by a factor until the aggregate rate of updates is at or below a Target Rate for the server (expressed as a number of updates per unit of time): $\Sigma_{i=0}^{n} 1/D_{Adjusted\ Time,i} \leq$ Target Rate. Here n is the number of endpoint devices assigned to a particular server and $D_{Adjusted\ Time,i}$ is the periodic update time for endpoint i.

According to some embodiments, the scaling factor can also take into consideration the expected number of calls that would be incorrectly routed at a particular update timing. For instance, the data analytics server can be configured to calculate and provide call frequency data for each endpoint device. This data can be used to determine the probability that the endpoint will be involved with a call during a given time period. Movement history data for the endpoint device can be collected and used by the VoIP server to determine a probability that, for a given time period, an endpoint device will move to a location that would result in a change to a selected carrier or media server. These two probabilities are then used to determine the probability that calls would be incorrectly routed at a particular scaling setting. The scaling setting can be adjusted to reduce the expected number of incorrectly routed calls below a desired level.

According to certain embodiments, the VoIP server can be configured to consider the relative reporting times for the endpoint devices in order to avoid congestion caused by reporting times being grouped together. This congestion can tax the VoIP server resources, such as the data connection bandwidth, processing time, and memory. For example, consider an example where a thousand endpoint devices that are each configured to report every 24 hours. In an extreme situation, all thousand endpoint devices might use the same starting time point (e.g., noon) from which they each calculate their respective update timings. This would result in all the endpoints attempting to provide location updates at the same time (e.g., at noon every day). This might overload the VoIP server with respect to one or more of its resources, resulting in poor performance until the VoIP server is able finish receiving and processing the updates. Accordingly, the VoIP server can be configured to identify congestion points by predicting when updates would be received by endpoint devices that are currently assigned to the VoIP server. The VoIP server can then attempt to balance the expected update times by specifying a different starting time point for each endpoint device, or for groups of endpoints. The VoIP server can transmit the desired starting time to relevant endpoint devices. Upon receipt of the starting time, each endpoint device can reset their respective trigger timer so that it begins at the updated starting time. There are alternative manners in which the VoIP server could achieve similar results, such as transmitting communications, at the start times, where the communications request that the corresponding endpoint device reset the trigger timer immediately. This would effectively set the starting time at the time that the communication was received.

In more complex situations, the endpoint devices can each have different trigger event timings (specifying the time between each location update). This can result in the expected update times converging even when the endpoint devices have different starting time points. Accordingly, the VoIP server can be configured to track the starting times and the trigger event timings for the endpoint devices to identify when the location updates converge. For instance, the VoIP server can identify situations where the number of location updates within a given time period (e.g., five minutes) exceeds a threshold. The threshold can be a predetermined maximum amount or a relative amount that is based upon the total amount of endpoints and their respective location update frequency.

According to some embodiments of the present disclosure, the VoIP server can be configured consider other VoIP server functions that would consume the available resources. This type of information can be collected and analyzed by the data analytics server 124. For example, the data analytics server 124 can build a VoIP call profile from prior call history and call summary metrics. The VoIP server can use this profile information to identify congestion points that are caused by something other than the location updates. The VoIP server can adjust the starting time points so that more endpoint devices provide their location updates during less congested times. The VoIP call profile might indicate, for example, that there is a high call volume during the day and low call volume during the night. The VoIP server can then adjust the start times so that more updates are provided at night than during the day.

Figure 6:
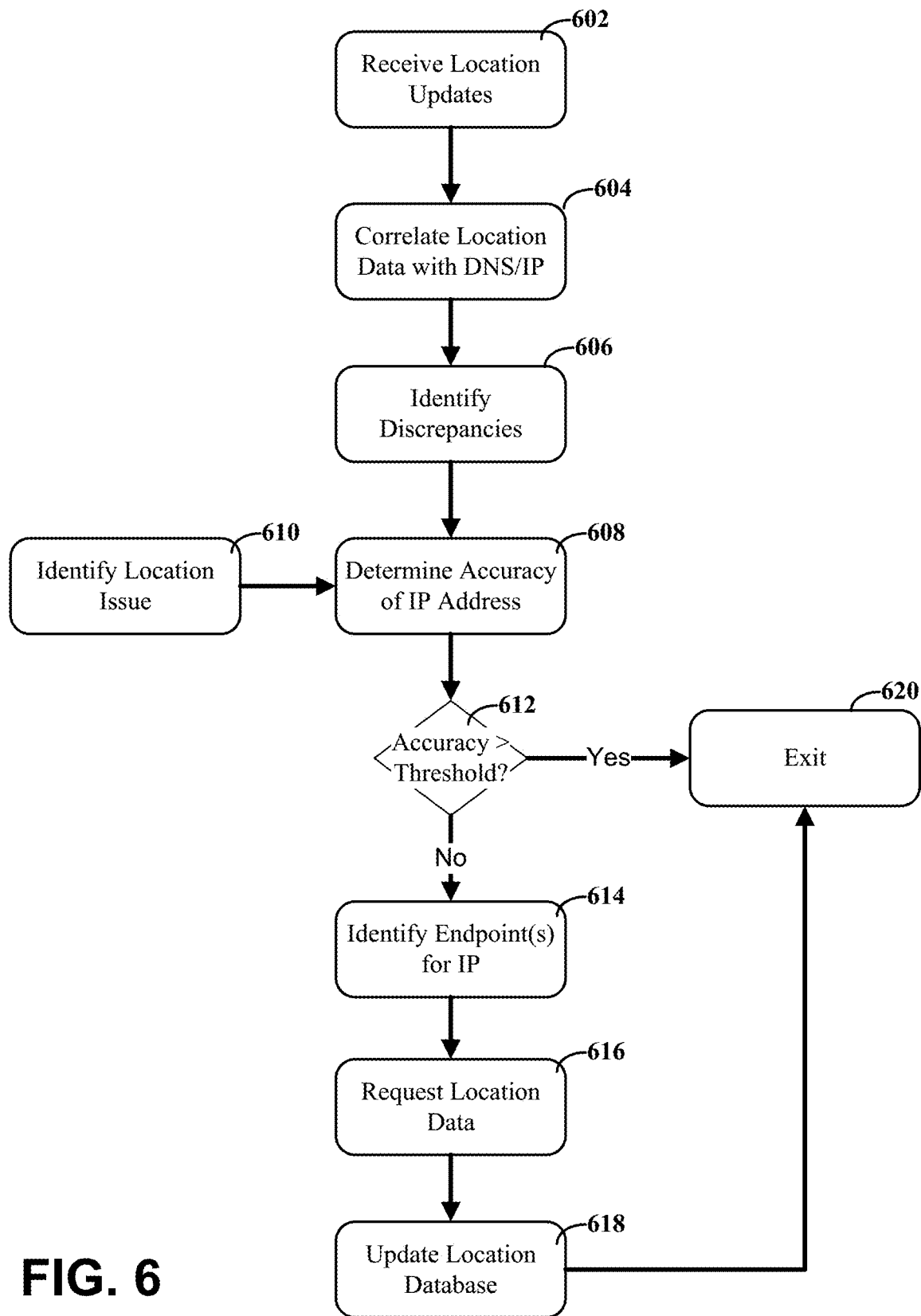
FIG. 6 depicts a flow diagram for processing and updating location addresses relative to IP addresses, consistent with embodiments of the present disclosure.

FIG. 6 depicts a flow diagram for processing and updating location addresses relative to IP addresses, consistent with embodiments of the present disclosure. The flow diagram can be triggered either by the receipt of location updates from endpoint devices, per block 602, or the identification of a problem with location information, per block 610. The identification of a problem or issue might correspond to the wrong carrier or data center having been selected based upon the current location information that is stored in the database for the particular IP address. For example, this might occur when an endpoint device has not yet provided an accurate location update and the DNS location information is inaccurate for the particular IP address.

In response to a received location update, the VoIP server can be configured to correlate the received location data with the particular IP address, per block 604. For example, when the location update data is provided, the VoIP server can extract the source IP address of the communication. The extracted IP address is then correlated (or matched) with the received location data so that the IP address can be used to access the location database. The VoIP server can then identify any discrepancies between the received location data and the location information stored in the location database (for the extracted IP address), per block 606. The discrepancies can be expressed in terms of a relative distance between the two locations. In some embodiments, the location database can store multiple past locations that were stored for the IP address, as might have been received by endpoint devices providing prior location updates. The discrepancies can be relative to the most recent location information or an average location determined by the historic location.

The VoIP server can then determine the accuracy of the location stored in the databased for the IP address, per block 608. As discussed herein, the accuracy can be expressed in terms of a confidence level or probabilistic determination. The VoIP server can compare the determined accuracy (or confidence level) to a threshold, per block 612. If the accuracy is above the threshold, the VoIP server can leave the current location information unchanged and exit the flow, per block 620. Otherwise, the VoIP server can identify how many endpoint devices are associated with the IP address, per block 614. In particular, the VoIP server can access a lookup table, or similar data structure, that links each IP address with the endpoint devices that use the IP address.

The VoIP server can then request location data from one or more of the identified endpoint devices, per block 616. In this manner, the VoIP server can proactively request additional location information to help resolve a potential location uncertainty. This can be particularly useful for situations where the endpoints that use an IP address are not located in the same geographic area. In particular, by requesting location information from the other endpoints, the VoIP server can prevent a situation where the location for an IP address is continually changing between locations based upon the most recent endpoint device to provide location information. Depending upon the data received from the request, the VoIP server can then update the location database with new location information, per block 618. The VoIP server can then exit the flow, per block 620.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, a (VoIP) endpoint device (or endpoint) includes a communication circuit and (computer) processing circuits which are configured to establish (VoIP) communication sessions with other endpoint devices (e.g., personal computers, IP-enabled mobile phones, and tablet computers). In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes), the activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. A system for providing data-communications services to a plurality of endpoint devices ("the endpoint devices"), each of the endpoint devices including communication circuitry for communicating data over the Internet, the system comprising:
   a data-communications server to provide the data-communications services to the endpoint devices and to determine a first probability that, for a given time period, one of the endpoint devices will move from one geographic location to another geographic location that would result in a change to a selected carrier or media server for communication with said one of the endpoint devices;
   a data analytics server to monitor and analyze call data associated with use of the data-communications services and the endpoint devices, and to calculate and provide call frequency data for each endpoint device; and
   processing circuitry, coupled to the data-communications server and responsive to the data analytics server, to:
   determine a second probability that one of the endpoint devices is to be involved with a call during a given time period, and to determine, based on the first probability and the second probability, that calls would be incorrectly routed, and
   modify, in response to a geographic-location mismatch, a location database to include entries specifying the geographic locations of the endpoint devices;
   wherein the data-communications server is further to route, in response to a determination by the processing circuitry that calls would be incorrectly routed, telephone calls for said one of the endpoint devices based upon the entries specifying the geographic locations.

2. The system of claim 1, wherein the data analytics server is to track call statistics concerning different call-related parameters including two or more of the following: call duration, call date, call time of day, called parties, endpoint devices, selected data centers, selected carriers, dropped calls, and transferred calls.

3. The system of claim 1, wherein the determination by the processing circuitry that calls would be incorrectly routed is to be based on an adjustable setting to reduce an expected number of incorrectly routed calls below a desired level.

4. The system of claim 1, wherein the data analytics server is further to identify congestion points by estimating or predicting when location updates may be received by the endpoint devices.

5. The system of claim 1, wherein the data-communications server is to generate a set of periodic location updates by using or setting values associated with timings to meet a target rate for received location updates.

6. The system of claim 1, wherein the data analytics server is to build, relative to the one of the endpoint devices, a call profile from prior call history and call summary metrics.

7. The system of claim 1, wherein the data-communications server is to build, relative to the one of the endpoint devices, a call profile from prior call history and call summary metrics and to use the call profile to identify congestion points that are caused by something other than location updates.

8. The system of claim 1, wherein the data-communications server is to adjust starting times for certain use of available circuit resources of the system so that more endpoint devices provide their location updates during times that are predicted as being less congested times.

9. The system of claim 1, wherein the data analytics server is to generate, based on call summary data associated with actual use of the data-communications server and a likelihood that an amount of server resources is available, a set of periodic updates for the endpoint devices to provide geolocation information for location updates to be processed by the system.

10. The system of claim 1, wherein the data-communications server is to build, relative to the one of the endpoint devices, a call profile from prior call history, wherein the call profile is to indicate that there is a high call volume during a day and low call volume during a specific portion of a day.

11. The system of claim 10, wherein the data-communications server is to adjust, in response the call profile, starting times for certain use of available circuit resources of the system.

12. The system of claim 1, wherein the data-communications server is to provide, in response to congestion points associated with communications involving the endpoint devices, a start time to the endpoint devices, wherein the start time indicates a timer start point for the endpoint devices to determine timings for respective periodic updates associated with the endpoint devices to provide geolocation information for location updates to be processed by the system.

13. The system of claim 1, wherein the data-communications server is to provide data to indicate an estimate or prediction associated with congestion points related to communications involving the endpoint devices.

14. The system of claim 13, wherein the data-communications server is to use the congestion points as input parameters for generating a set of periodic updates associated with the endpoint devices to provide geolocation information for location updates to be processed by the system.

15. The system of claim 1, wherein the data-communications server is to: provide data to indicate an estimate or prediction associated with congestion points related to communications involving the endpoint devices; and use the congestion points as one or more input parameters for generating a set of periodic updates for the endpoint devices to provide geolocation information to the data-communications server for location updates to be processed by the server, wherein said one or more input parameters includes an expected mobility of a respective endpoint device of the endpoint devices.

16. The system of claim 1, wherein the data-communications server is to generate a set of periodic location updates by setting values for a set of periodic updates for the endpoint devices to provide geolocation information to the server for location updates to be processed by the data-communications server.

17. The system of claim 16, wherein the set of periodic updates is a function of or based on a load associated with the data-communications server.

18. The system of claim 1, wherein the data-communications services include Voice over Internet Protocol (VoIP) services.

19. The system of claim 1, wherein the data-communications server is to generate a set of periodic location updates by setting values for a set of periodic updates for the endpoint devices to provide geolocation information to the data-communications server for location updates to be processed by the system, and wherein the data analytics server is further configured to identify congestion points by estimating or predicting when location updates may be received by the endpoint devices and to use the congestion points as input parameters for generating a set of periodic updates.

\* \* \* \* \*